United States Patent
Golightly et al.

(12) 
(10) Patent No.: US 6,656,242 B1
(45) Date of Patent: Dec. 2, 2003

(54) HOT MIX ASPHALT FACILITY

(75) Inventors: Jon Eldon Golightly, Louisville, KY (US); Ronald C. Lawson, Fisherville, KY (US)

(73) Assignee: Asphalt Innovators, Inc., Louisville, KY (US)

( * ) Notice: Subject to any disclaimer, the term of this patent is extended or adjusted under 35 U.S.C. 154(b) by 0 days.

(21) Appl. No.: 10/152,358

(22) Filed: May 21, 2002

(51) Int. Cl.[7] ............................................. B01D 50/00
(52) U.S. Cl. ..................... 55/315; 55/342; 55/385.1; 55/467; 366/22
(58) Field of Search ..................... 55/315, 342, 343, 55/345, 341.1, 385.1, 467; 366/22, 25

(56) References Cited

U.S. PATENT DOCUMENTS 3,809,373 A * 5/1974 Brock ........................ 366/18
4,921,730 A * 5/1990 Sasaki ....................... 427/138
5,252,124 A   10/1993 Brashears et al.
5,520,124 A * 5/1996 Amon ........................ 110/246
5,607,232 A    3/1997 Dahl

FOREIGN PATENT DOCUMENTS

JP          08226104 A  *  9/1996

* cited by examiner

*Primary Examiner*—Robert A. Hopkins
(74) *Attorney, Agent, or Firm*—Camoriano and Associates; Theresa Fritz Camoriano; Guillermo Camoriano

(57) ABSTRACT

A hot mix asphalt batching plant has two separate air handling systems—one for the dryer and another for handling the fugitive dust. These two systems are separate, so that variations in operating conditions for the dryer do not affect the performance of the fugitive air handling system.

11 Claims, 4 Drawing Sheets

HOT MIX ASPHALT FACILITY

BACKGROUND OF THE INVENTION

The present invention relates to hot mix asphalt facilities, and, more specifically, to a new air handling system for hot mix asphalt batch plants. Prior art hot mix asphalt facilities typically are either the continuous "drum mixing" process or the batch tower (or "batch mixing") process. In a typical "drum mixing" process, the aggregate enters a drum mixer/dryer at one end of the drum, where it is dried. It progresses along the drum to a point where liquid asphalt is introduced, and then it is mixed with the liquid asphalt on a continuous basis as it progresses toward the other end of the drum. Recycled asphaltic product (RAP) may also be added within this drum mixer/dryer. The finished product is then conveyed via an elevator to a storage silo, where it awaits transfer to trucks, railroad cars, or other means of conveyance to the end user. A single air handling system is used in a "drum mixing" process plant, pulling air through the dryer/mixer.

Prior art hot mix asphalt batch plants typically dry the aggregate in a drying drum. The hot, dry aggregate is then conveyed to a batching tower, where it is held until it is to be weighed out and mixed with liquid asphalt and then conveyed to a silo. These batch plants also use a single air handling system. An exhaust fan draws combustion gases and air from the dryer as well as drawing what is referred to as "fugitive" air from the batching tower and the rest of the facility, through one or more dust collectors, and then exhausting the air to the atmosphere. Fugitive dust is the dust that is produced in other parts of the facility outside of the dryer, such as the batching tower, bucket elevator, and mixer. By continually pulling a vacuum on the various parts of the asphalt plant, fugitive dust is prevented from leaking out into the atmosphere and is instead pulled through the single air treatment system.

The dryer includes a burner which requires a proper "draft" or flow of air for its operation. The presence of too much air causes unnecessary cooling of the air through the dryer, stealing drying capacity from the dryer and therefore reducing the efficiency of the facility. The presence of insufficient air causes the burner to "puff", allowing hot gas to escape and/or leading to a loss of ignition. If the burner puffs out and gas enters the dryer, re-ignition may even cause an explosion in the dryer.

Having a single air handling system for the hot mix asphalt facility appears to make sense from an initial investment point of view. The air from the dryer, as well as the fugitive air, is hot, requiring a dust collector such as a bag house equipped with relatively expensive dust bags capable of handling these high temperatures. A single bag house minimizes the capital investment in this non-revenue producing area of the facility, which appears to be a cost-effective and sensible approach. However, the present invention takes advantage of information that is overlooked by experts in the industry; namely, by recognizing that the use of a single air handling system prevents the operational optimization of either the drum dryer or the fugitive air handling system, thereby making the plant much less efficient and less productive than it could be.

SUMMARY OF THE INVENTION

The present invention goes counter to the accepted wisdom of the efficiency and practicality of using a single air handling system in a hot mix asphalt batch facility. Instead, the present invention provides two separate air handling systems—one for the dryer and one for the fugitive air—so that each of these air handling systems may be operationally optimized, thus improving the operating efficiency of the entire hot mix asphalt facility.

DESCRIPTION OF THE PREFERRED EMBODIMENT

Figure 1:
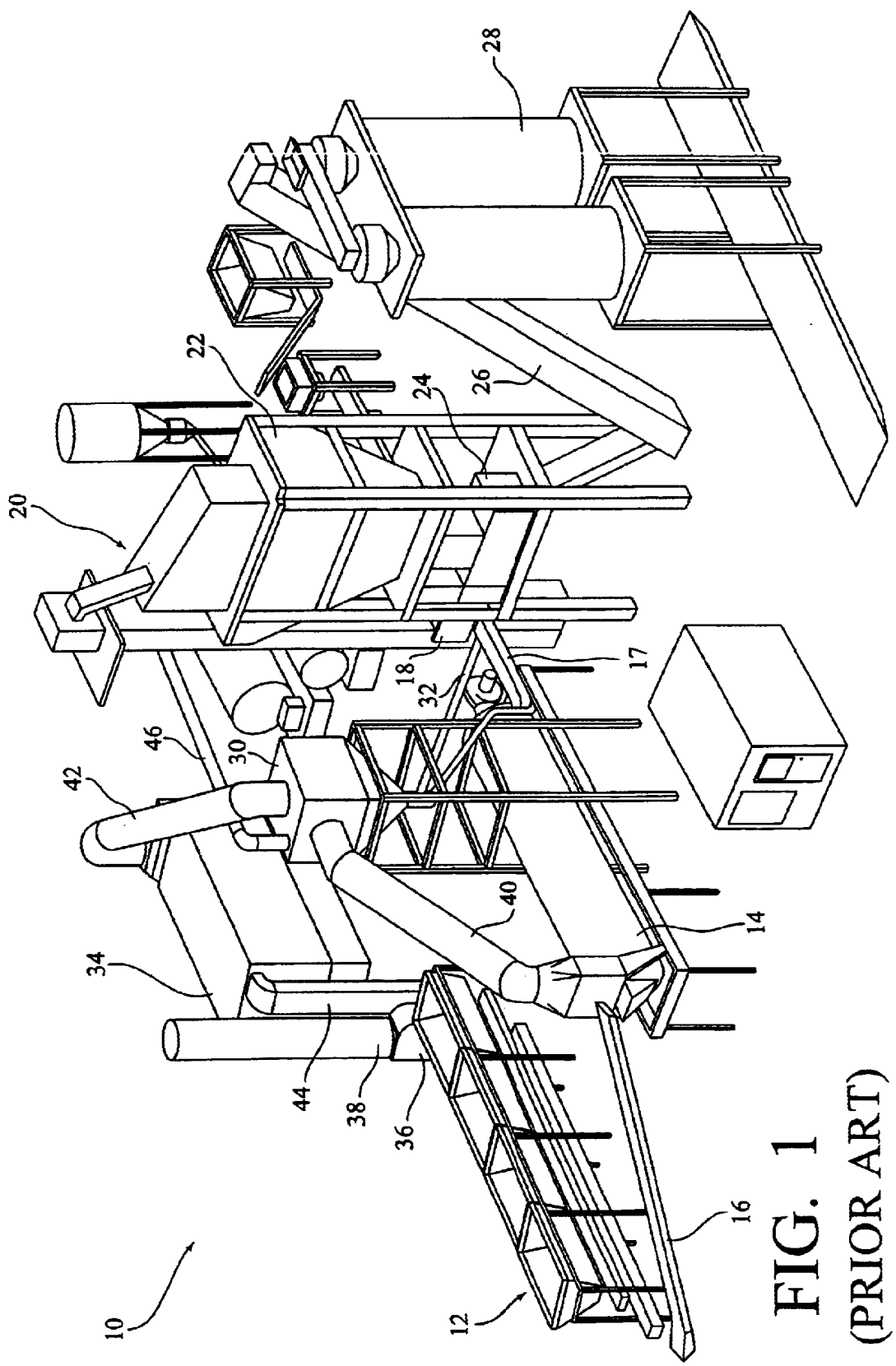
FIG. 1 is a perspective view of a traditional hot mix asphalt batch plant.
Figure 2:
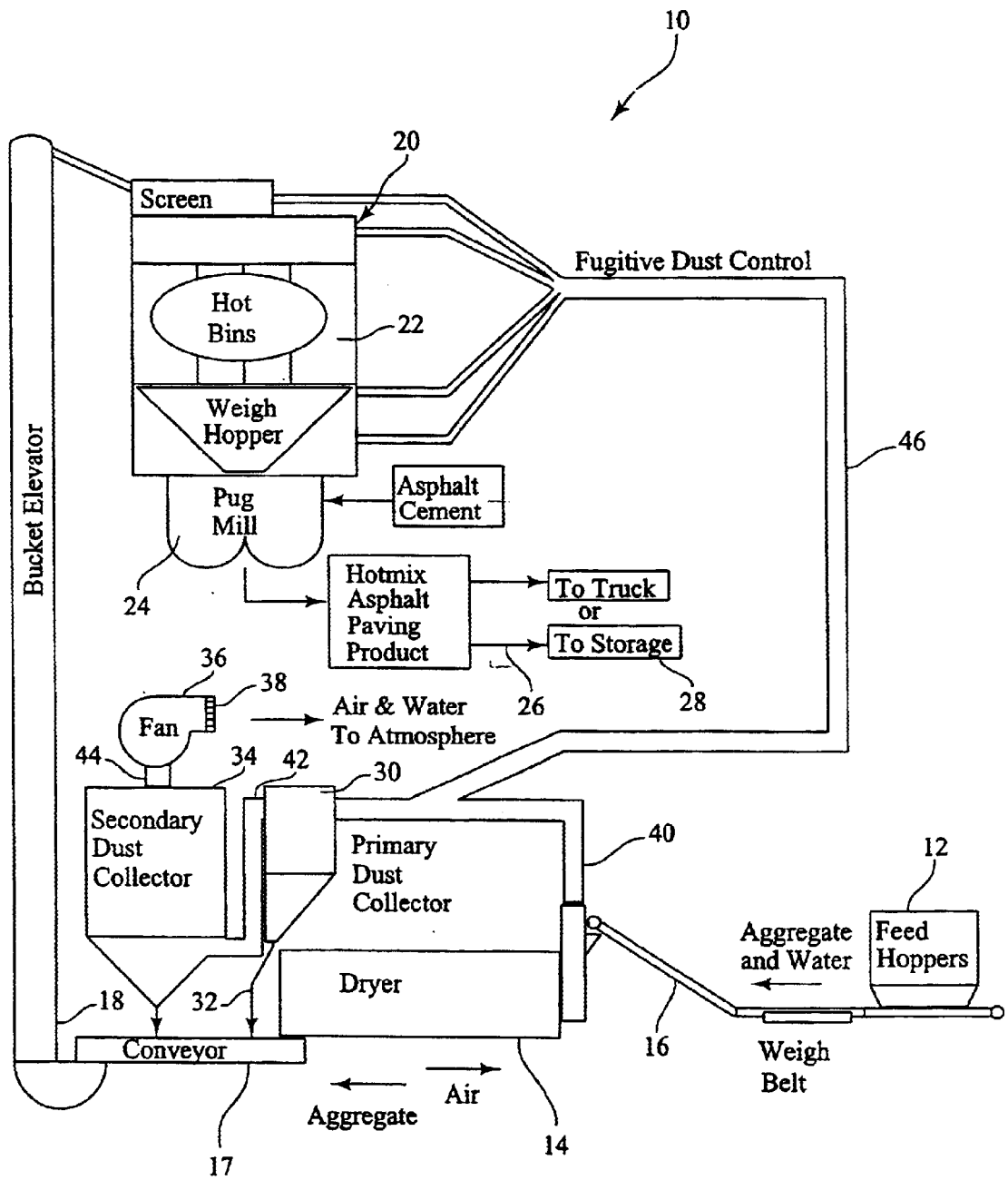
FIG. 2 is a schematic of the hot mix asphalt batch plant of FIG. 1.

In a typical prior art "batch mixing" process plant 10, as shown in FIGS. 1 and 2, aggregate (gravel and sand) is fed from hoppers known as cold feed hoppers 12, to a first end of a drum dryer 14 via a conveyor 16. The aggregate typically has between 3% and 12% moisture as it enters the first end of the drum dryer 14, and it is heated and dried in the drum dryer 14 by a flow of hot gas at approximately 1,800 to 2,700° F., flowing in counter direction to the aggregate. The hot gas is generated by a burner (typically gas or oil fired) located at the second end of the dryer 14, opposite the first end where the aggregate enters the dryer 14. A more detailed explanation of the burner and its operation is provided later. (Other types of driers, such as parallel flow driers, are also known in the industry and may be used in the present invention.) The hot and dry aggregate is then conveyed, via a conveyor 17 and a bucket elevator 18, to a batching tower 20. In the batching tower 20, the aggregate is screened and segregated based on particle size, and the segregated, dried aggregate is held in hot bins 22. Then, prescribed amounts of the different sized aggregate are weighed and fed by gravity into a mixer such as a pug mill 24, where liquid asphalt cement and other ingredients are added and mixed to produce the hot mix asphalt, which is then loaded onto trucks or railroad cars, or is conveyed, via another elevator 26, to an insulated storage silo 28 to await transfer to trucks or railroad cars. The entire facility has a single air handling system which is used to provide the draft required for the dryer (typically with a gas or oil fired burner) and to provide a "fugitive" air capture system as described below.

The air handling system typically includes a primary dust collector 30, a secondary dust collector 34, an exhaust fan 36, and a damper 38, which is located downstream of the fan 36. The primary dust collector 30 is typically a cyclone separator or a knock-out box that removes the larger particles, which are then returned, via the conveyor 32, to the conveyor 17 leading to the bucket elevator 18 of the batching tower 20. The secondary dust collector 34 is typically a bag house with dust bags capable of withstanding the elevated temperatures (typically in the 300–350° F. range) of the exhaust gases. Of course, other known dust collectors may be used (such as a wet scrubber), or there may be only one dust collector rather than two. Ducting 40 connects the dryer 14 outlet to the primary dust collector 30. Ducting 42 connects the outlet of the primary dust collector 30 to the secondary dust collector 34. Ducting 44 connects the outlet of the secondary dust collector 34 to the exhaust fan 36, and the exhaust fan 36 releases the gases to the atmosphere through the damper 38. The air handling system also captures fugitive dust via the ducting 46, as explained below.

The batching tower 20 generates substantial amounts of dust, because it is in this section that the dry aggregate is handled (conveyed, lifted, screened for sizing, stored, weighed, and agitated/mixed with the asphalt cement and other ingredients). Environmental regulations require that these sources of fugitive dust be captured and contained. In order to comply with these regulations, manufacturers and operators have enclosed the dust generation areas and have installed fugitive air ducting 46 leading from these dust generation areas either to the primary or to the secondary dust collectors 30, 34, respectively. Air is pulled through openings in the batching tower 20 and openings in the bucket elevator 18, through the fugitive air ducting 46, to the dust collectors 30, 34, carrying with it the fugitive dust that is generated in those areas.

In the embodiment shown in FIGS. 1 and 2, the fugitive air lines 46 lead to the primary dust collector 30. The burden for evacuating the particulate laden air in the fugitive air system is placed on the exhaust fan 36, which is already handling the load from the dryer 14.

The fugitive air handling system is generally sized to generate an air velocity in the ducting 46 of at least 4,000 fpm (feet per minute) in order to keep the dust suspended in the air as it is passing through the ducting 46. Considerably higher velocities generally result in higher abrasion and thus faster erosion, especially in fittings such as elbows and tees. If the velocity falls much below 4,000 fpm, the dust falls out of suspension in the ducting 46, and the ducting 46 may become plugged and ineffective.

Figure 4:
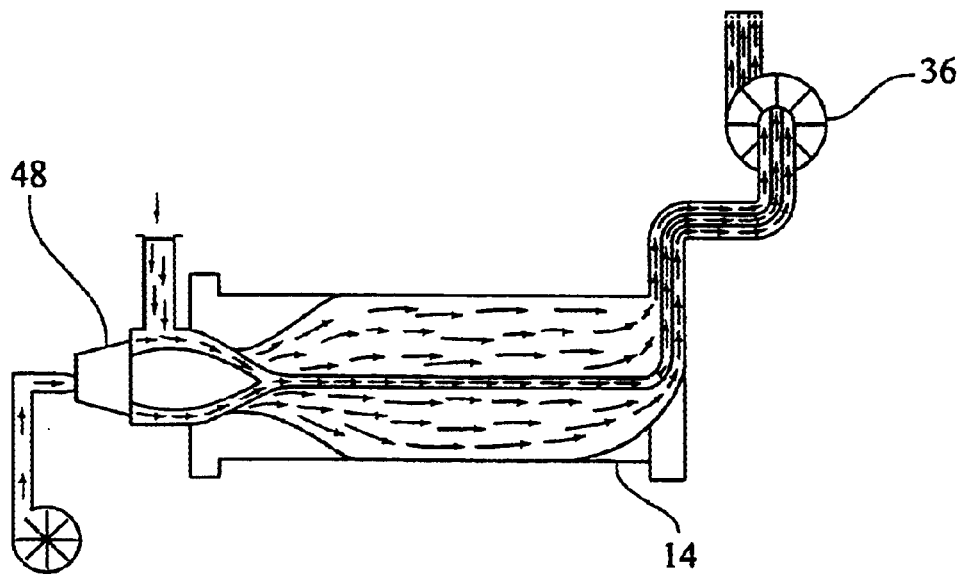
FIG. 4 is a schematic of a drum dryer in which the combustion air comes from two sources.
Figure 5:
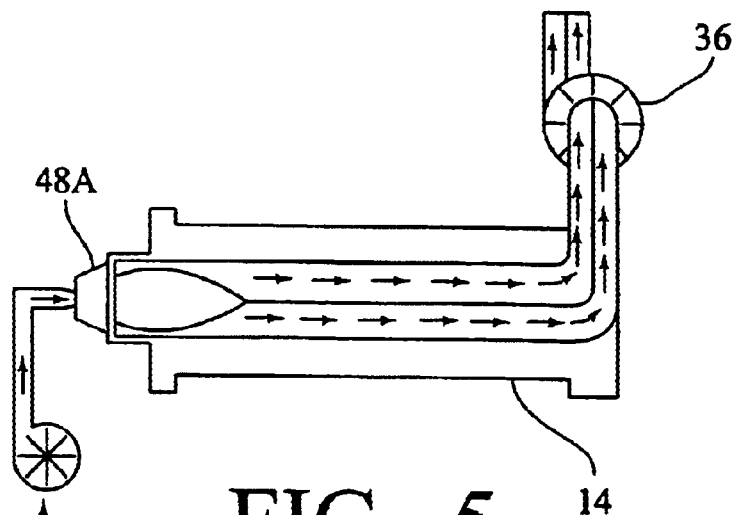
FIG. 5 is a schematic of a drum dryer with all of the combustion air supplied by a blower at the burner.

Referring now to FIGS. 4 and 5, the burner in the drum dryer 14 may be of the type with both forced and induced draft air for combustion (such as burner 48 seen in FIG. 4), or of the type with all forced draft air for combustion (burner 48A seen in FIG. 5). In either case, as the air is heated from ambient conditions to a temperature ranging between 1,800 and 2,700° F., the air/gas mixture expands to between 4 and 6 times its standard volume, causing a pressure rise (actually a drop in the vacuum level) at the burner end of the dryer 14. The exhaust fan damper 38 (See FIGS. 1 and 2) is opened or closed by a controller, based on this fall or rise in vacuum level, respectively, as described below.

Four control variables are utilized to operate this system:
1—Volume of the aggregate being fed to the dryer;
2—Aggregate outlet temperature;
3—Pressure at the burner end of the dryer; and
4—Maximum air temperature at discharge of the dryer.

The volume of aggregate is set based on the tonnage (capacity) required of the facility 10. The outlet temperature of the aggregate is measured as the hot rock and sand leave the dryer 14. This temperature is measured against a set point in the control system. If the temperature is not hot enough, the controller increases the flame in the burner 48 to provide hotter air to the dryer 14. Conversely, if the temperature is too hot, the controller decreases the flame in the burner 48. As indicated earlier, as the flame at the burner 48 increases or decreases, there is a vacuum level decrease or increase, respectively, at the burner end of the dryer 48. This pressure is monitored and controlled against a set point by modulating the actuator for the damper 38. In this manner, in a properly controlled system, the correct volume of air enters the dryer even during changing conditions.

However, in typical hot mix asphalt facilities of the prior art, since the fugitive air system is interconnected with the dryer exhaust fan, the result is a less than satisfactory operation of the hot mix asphalt facility as evidenced by the following scenarios:

If the exhaust fan 36 is sized for the correct air flow volume when the burner 48 is at its maximum, then, if the additional load of the fugitive air system is added to the fan 36, this load must be subtracted from the volume available for operation of the dryer 14, thus reducing the dryer's capacity accordingly. Thus, retrofitting an existing hot mix asphalt facility to comply with environmental regulations by simply enclosing the batching tower 20 and tying the fugitive air ducting 46 to the existing air handling system results in reduced overall capacity of the hot mix asphalt facility.

An option is to install an oversized exhaust fan 36 to handle the additional load of the fugitive air system. Assume that the exhaust fan 36 is sized for the correct air flow volume when the burner 48 is at its maximum and when the fugitive air system is operating at the correct velocity to keep the dust in suspension. Now, when the plant capacity is reduced (for instance when lower tonnage is required or when the aggregate is coming out too hot because of lower throughput or lower initial moisture content), the flame at the burner 48 is reduced, the vacuum level increases at the burner 48 end of the dryer 14, and the damper 38 is closed down partially to modulate the amount of air going into the dryer 14. Since the fugitive air system is tied into the same air handling system, the pressures and air flows in one portion of the system affect the pressures and air flows in the rest of the system. As the exhaust fan 36 is modulated down due to increased vacuum level at the burner 48, the volume of air drawn through the fugitive air system also decreases. Since the size of the fugitive air ducting 46 remains unchanged, as the volume of air decreases, the velocity of the air in the ducting 46 also decreases and may well fall below the 4,000 fpm considered a minimum velocity in order to keep the dust from falling out of suspension and plugging the ducting 46. Thus, retrofitting an existing hot mix asphalt facility to comply with environmental regulations by enclosing the batching tower 20, tying the fugitive air ducting 46 to the existing air handling system, and installing a larger exhaust fan 36 results in dust settling and plugging the ducting 46. The facility eventually must be shut down to deal with this maintenance problem, resulting in reduced overall capacity of the hot mix asphalt facility.

Some operators add a fugitive fan in the fugitive air ducting 46, before it ties into the air handling system of the dryer 14, in order to try to maintain the necessary air flow volume in the fugitive ducting 46. This fugitive fan is sized to provide the necessary volume, when the flame in the burner 48 is ramped down and the exhaust fan 36 is modulated partially closed, to induce the required air velocity in the fugitive air ducting 46 to keep the dust in suspension (approximately 4,000 fpm). However, a fan is a differential pressure machine, meaning that, like a centrifugal pump, if the upstream pressure remains essentially constant, it puts out a higher volume when the downstream pressure is lower, and a lesser volume when the downstream pressure is higher. When the exhaust fan 36 is modulated open by the damper 38 to account for a ramped-up burner 48, the pressure drops in the air handling system (it is this drop in pressure that draws more air through the dryer 14). The fugitive air fan sees this as a drop in downstream pressure, and the fugitive fan puts out a higher volume of air. This higher volume of air must be handled by the exhaust fan 36 as an additional air load, which thus steals capacity from the dryer 14. Thus, retrofitting an existing hot mix asphalt facility by enclosing the batching tower 20, tying the fugitive air ducting 46 to the existing air handling system, and installing a fugitive air fan to maintain velocity in the ducting 46 results in reduced overall capacity of the hot mix asphalt facility.

Figure 3:
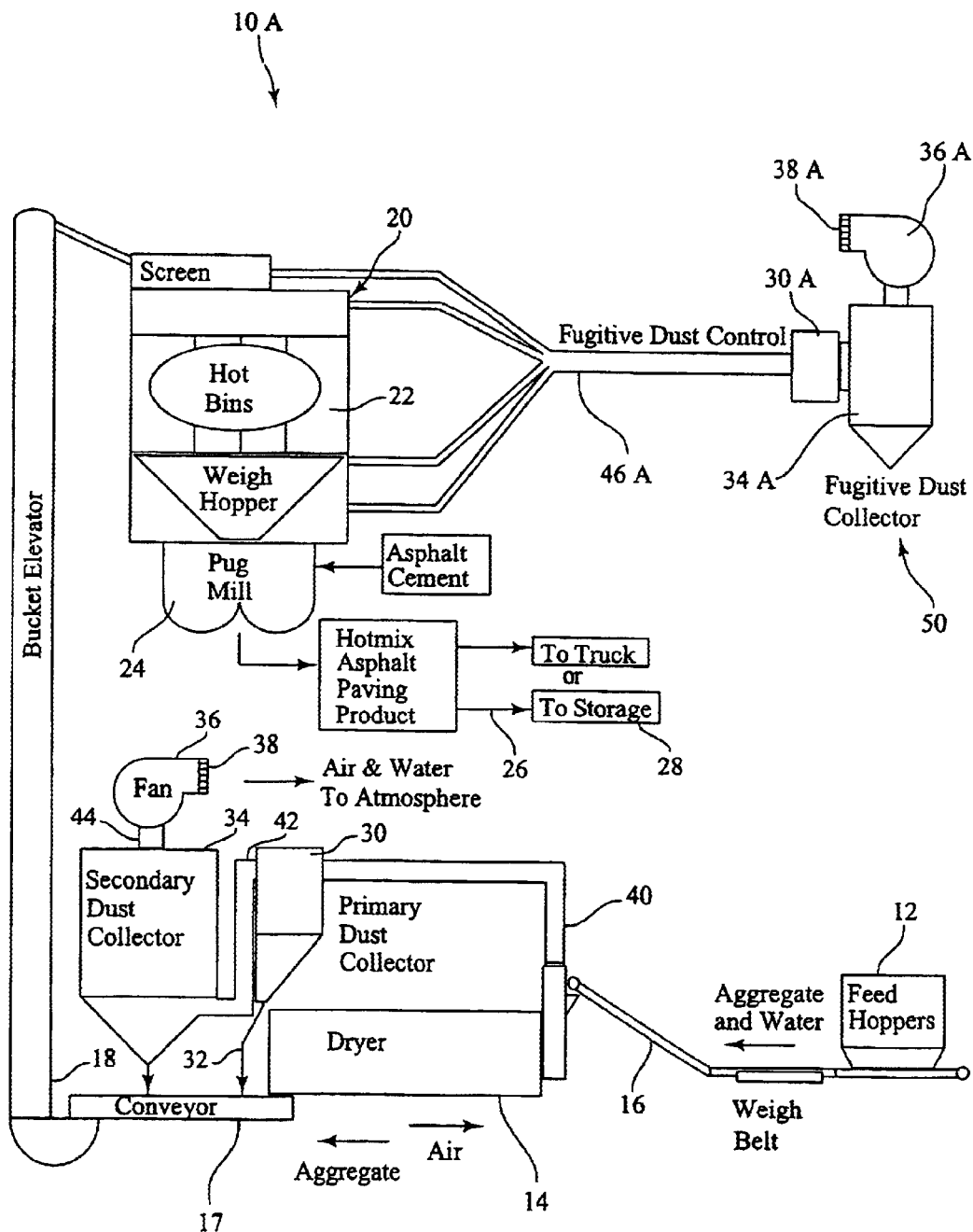
FIG. 3 is a schematic of a hot mix asphalt batch plant made in accordance with the present invention.

The present invention solves the foregoing problems by providing a separate fugitive air handling system which is independent of the air handling system for the dryer 14. This new arrangement may be achieved either by retrofitting the hot mix asphalt facility of FIGS. 1 and 2 or by designing an entirely new system. FIG. 3 is a schematic of the resulting hot mix asphalt facility 10A, which includes a separate fugitive air handling system.

In this preferred embodiment 10A, the separate fugitive dust control system includes fugitive ducting 46A leading to its own primary dust collector 30A (such as a knock-out box or a cyclone separator), its own secondary dust collector 34A (such as a bag house), its own exhaust fan 36A, sized to provide the air volume handling capacity to induce the velocity in the ducting 46A to keep the dust in suspension, and its own damper 38A. The dryer 14 continues to have its original primary and secondary dust collectors 30, 34. Now, as the flame at the burner 48 increases or decreases to compensate for various operating conditions, the original damper 38 is able to regulate the air flow through the dryer 14 without appreciably affecting the air flow through the fugitive air system, thus permitting the dryer 14 to operate at optimum levels. Similarly, the fugitive air system is able to operate at an efficient and effective condition which approaches a steady state, since it is essentially unaffected by variations in the operating conditions of the dryer 14, again optimizing that system. In this manner, the operating efficiency of the hot mix asphalt facility is not adversely affected by the air handling system as it has been in prior art systems. The additional expense of a separate air handling system for treating the fugitive air is more than offset by the higher and more consistent production of the facility.

While the schematic of FIG. 3 shows two entirely separate dust collector systems at two entirely separate locations, one for the dryer 14 and the other for the batching tower 20 and other dust-producing portions of the facility, it would be possible for these dust collector systems to be adjacent to each other at the same location, as long as the air flows through the two systems are separate from each other, meaning that the air flows and pressure drops through one of the systems do not appreciably affect the air flows and pressure drops through the other system. Also, while this preferred embodiment shows a knockout box and bag house for each of the air treatment systems, it is understood that any type of air treatment apparatus could be used for each of the air treatment systems, including a system with only one type of dust collector or a system with more than two types of dust collectors.

In order to retrofit a hot mix asphalt facility as shown in FIGS. 1 and 2 to make the improved plant shown in FIG. 3, the fugitive air ducting 46 connecting the fugitive dust control system to the primary and secondary dust collectors 30, 34 is cut off or closed off, and the fugitive ducting 46A is connected from the batching tower 20 (and other fugitive dust-producing parts of the plant) to the new fugitive dust collection system 50.

It will be obvious to those skilled in the art that modifications may be made to the embodiment described above without departing from the scope of the invention as claimed.

What is claimed is:

1. A method for retrofitting a hot mix asphalt batch plant which includes a dryer, a batching tower, and a first air handling system, including a first exhaust fan and ducting connected from said dryer and said batching tower to a first dust collection system, comprising the steps of:

installing a second air handling system, including a second exhaust fan and a second dust collection system; and disconnecting the ducting from said batching tower to said first air handling system and connecting ducting from said batching tower to said second air handling system, wherein the air flow through said first air handling system is separate from the air flow through said second air handling system.

2. A method for retrofitting a hot mix asphalt batch plant as recited in claim 1, wherein said fan in said second air handling system is sized to provide a sufficient air velocity in its ducting to maintain the dust in suspension.

3. A method for retrofitting a hot mix asphalt batch plant as recited in claim 2, wherein said air velocity in said second air handling system is in the range of 4,000 feet per minute.

4. A method for retrofitting a hot mix asphalt batch plant as recited in claim 1, wherein said first dust collection system includes a primary dust collector and a secondary dust collector.

5. A method for retrofitting a hot mix asphalt batch plant as recited in claim 4, wherein said primary dust collector is from the group consisting of knock-out boxes and cyclone separators.

6. A method for retrofitting a hot mix asphalt batch plant as recited in claim 1, wherein said second air handling system includes a primary dust collector and a secondary dust collector.

7. A method for retrofitting a hot mix asphalt batch plant as recited in claim 6, wherein said secondary dust collector is a bag house.

8. A hot mix asphalt facility, comprising:

a first air handling system including a first exhaust fan and a first dust collector;

a dryer, including ducting connecting said dryer to said first air handling system;

a second air handling system which receives fugitive dust generated outside of said dryer, including a second exhaust fan and a second dust collector, wherein said first and second air handling systems are separate.

9. A hot mix asphalt facility as recited in claim 8, wherein said facility includes a batching tower, which is connected by ducting to said second air handling system.

10. A hot mix asphalt facility as recited in claim 9, wherein said second dust collector includes a bag house.

11. A hot mix asphalt facility as recited in claim 10, wherein said second dust collector also includes a primary dust collecting device from the group consisting of knock-out boxes and cyclone separators.

* * * * *